United States Patent
Nunoe

(10) Patent No.: US 7,475,398 B2
(45) Date of Patent: Jan. 6, 2009

(54) SYSTEM AND METHOD FOR IMPLEMENTING A SMART SYSTEM CALL

(75) Inventor: Hdei Nunoe, Tokyo (JP)

(73) Assignee: Wind River Systems, Inc., Alameda, CA (US)

( * ) Notice: Subject to any disclaimer, the term of this patent is extended or adjusted under 35 U.S.C. 154(b) by 1468 days.

(21) Appl. No.: 09/920,995

(22) Filed: Aug. 1, 2001

(65) Prior Publication Data

US 2002/0108028 A1     Aug. 8, 2002

(51) Int. Cl.
G06F 9/46 (2006.01)
G06F 13/24 (2006.01)
G06F 12/00 (2006.01)
H04L 9/00 (2006.01)

(52) U.S. Cl. .................. 718/104; 713/164; 710/260; 711/163

(58) Field of Classification Search ......... 711/100–155, 711/163; 713/150–202; 718/100–108; 719/311–332; 707/9; 709/213–216; 710/200–266; 712/214, 712/215; 717/124, 127; 726/27
See application file for complete search history.

(56) References Cited

U.S. PATENT DOCUMENTS

| | | | |
|---|---|---|---|
| 4,835,677 A | 5/1989 | Sato et al. ................... 718/1 |
| 5,848,435 A | 12/1998 | Brant et al. ................. 711/152 |
| 6,175,916 B1 * | 1/2001 | Ginsberg et al. ............ 712/228 |
| 6,308,255 B1 * | 10/2001 | Gorishek et al. ............ 712/209 |
| 6,529,985 B1 * | 3/2003 | Deianov et al. ............. 710/260 |
| 6,542,919 B1 * | 4/2003 | Wendorf et al. ............. 718/100 |
| 6,658,571 B1 * | 12/2003 | O'Brien et al. ............. 713/200 |
| 6,735,703 B1 * | 5/2004 | Kilpatrick et al. .......... 713/201 |
| 2005/0251864 A1 * | 11/2005 | Kelley et al. ................ 726/26 |

* cited by examiner

*Primary Examiner*—Li B Zhen
*Assistant Examiner*—Charles E Anya
(74) *Attorney, Agent, or Firm*—Fay Kaplun & Marcin, LLP

(57) ABSTRACT

According to the present invention, a "smart system call" may be implemented. The smart system call employs a code "stub" that is used to make function calls to privileged memory locations. The code stub includes facilities to determine the current mode of execution (e.g., privileged, unprivileged), and where the current mode is sufficiently trusted, allows a direct access to the desired memory address. If the current mode is not sufficiently trusted (e.g., unprivileged), an alternate indirect system call mechanism may be employed, such as an interrupt-based, exception-based, or hardware-assisted system call. Additionally, the smart system call permits selection of a system call method based on processor type, which may be used, for example, for porting to processor architectures which support specialized hardware-assisted system call instructions.

1 Claim, 4 Drawing Sheets

SYSTEM AND METHOD FOR IMPLEMENTING A SMART SYSTEM CALL

BACKGROUND INFORMATION

Computing systems generally use an operating system to provide system resource management for various software applications that may execute in the computing system. The operating system itself typically employs a kernel and a set of libraries and/or utilities. The kernel includes the most basic (and necessary) operating system functions and data structures (such as a task scheduler and I/O functions), while the libraries/utilities may include other functionality which is useful to applications (such as a network stack). In computing systems employing a flat, protectionless memory model, applications may access the operating system functions and data structures by linking to the memory locations associated with the desired function/data structure and directly accessing the memory locations associated with the desired function/data structure at run time.

In order to protect the integrity of the operating system during the execution of application software—for example, during debugging—operating systems may employ a memory protection scheme that shields critical operating system-related memory areas from access. For example, memory space for kernel functions and data structures may be logically isolated from memory space in which application functions and data structures are stored. Memory access to kernel memory space may be further restricted through the use of a Memory Management Unit (MMU) that restricts memory accesses to protected memory areas. In addition, some microprocessors provide for multiple "modes" of operation—for example, a "user" mode for the execution of applications and other non-trusted software, and a "supervisor" mode for the execution of kernel functions and other trusted software.

In order to allow applications to use kernel facilities in systems which use a memory protection scheme, special "system call" procedures have been implemented. For example, in some operating systems, all accesses to kernel memory space are performed indirectly via an interrupt request to specified interrupt numbers (using, for example, and "INT xx" processor instruction (sometimes called an "op code"), where the "xx" is the number of the interrupt), with parameters passed via specified registers or memory locations. The interrupt handler is used to invoke the desired kernel function, thus preventing the calling program from directly accessing the kernel. Another construct that has been used is an exception-based system call, which uses exceptions generated by a memory management unit (MMU) as a result of direct memory accesses to enforce the memory protection scheme. An advantage of the exception-based system call is that a special system call instruction is not needed, and therefore program code can invoke "system" functions and data (i.e., located in protected memory areas) in a fashion similar to that used to invoke "non-system" functions and data, as well as avoid the use of additional tasks to achieve such access.

The use of system calls in protected memory systems, however, introduces a significant amount of delay into system memory access. For example, the interrupt-based system call requires the generation of an interrupt, the execution of an interrupt handler to enable the system memory access, and perhaps the creation of a "system task" to perform the desired function/memory access. Even the exception-based system call requires the processing of the exception (although only when making an access to a protected memory region). Thus, in order to maximize execution speed, it is desirable to run applications using a protectionless memory system.

Developers have previously attempted to utilize memory protection schemes during application development. The protection scheme protects the operating system during the implementation phase and can be used to indicate programming errors (e.g., illegal modification of kernel data structures). Once the application has been tested and a degree of confidence in the application's trustworthiness has been determined, application designers remove the protection mechanisms, which heretofore required actually changing the program code to provide direct access to previously protected memory areas. Such changes not only were time-consuming, but introduced the possibility of introducing additional bugs into the application. Additionally, application developers have been limited to the single method of invoking system calls supported by the operating system, even where no protection was desired, or faster execution speed could be achieved using alternative system call techniques.

SUMMARY

As one of the preferred embodiments according to the present invention, a method is provided, comprising the steps of determining a current processing mode of an executing software function, and when the current processing mode is a privileged processing mode, executing a direct program flow control instruction to directly access an instruction within software having the privileged processing mode. When the current processing mode is an unprivileged processing mode, executing an indirect program flow control instruction to cause execution of the instruction within software having the privileged processing mode.

As another of the preferred embodiments according to the present invention, a method is provided comprising the steps of identifying a program code segment implementing an access to a memory area to be executed within a privileged processing mode, and replacing the program code segment with a substitute code segment. The substitute code segment includes program code to identify a current processing mode of the program code segment, execute a direct program flow control instruction if the current processing mode is the privileged processing mode, and execute an indirect program flow control instruction if the current processing mode is an unprivileged processing mode.

DETAILED DESCRIPTION

Throughout the foregoing description, reference will be made to "modes" of protection related to the level of protection afforded functions executing in a computer system. For purposes of this description, an "unprivileged" mode is a mode of protection associated with the lower level of access rights to memory in the computing system. A "privileged" mode is a mode of protection associated with the higher level of access rights to memory in the computer system. Various computing systems use different descriptions for these terms and may include more than two protection levels. As will be clear from the discussion below, the implementations according to the present invention would encompass such equivalent descriptions.

According to the present invention, a "smart system call" may be implemented. The smart system call employs a code "stub" that is used by unprivileged applications to make function calls to privileged memory locations. The code stub includes facilities to determine the current mode of execution (e.g., privileged, unprivileged), and where the current mode is sufficiently trusted, allows a direct access to the desired memory address. If the current mode is not sufficiently trusted (e.g., unprivileged), an alternate indirect system call mechanism may be employed, such as an interrupt or exception based system call (which may cause the spawning of privileged mode tasks to execute the desired function). Additionally, the smart system call permits selection of a system call method based on processor type, which may be used, for example, for porting to processor architectures which support specialized system call instructions.

Preferred exemplary embodiments according to the present invention implement the smart system call in conjunction with the Pentium® III microprocessor (available from Intel Corporation, Santa Clara, Calif.). Alternatively, other microprocessors could be used. The Pentium® III microprocessor provides an on-chip MMU for processing memory accesses, as well as a "hardware-assisted" facility for performing memory access to protected memory—the "sysenter" op code and "sysexit" op code. As will be seen below, the exemplary embodiments are applicable to a variety of commercially available operating systems and microprocessors.

Figure 1:
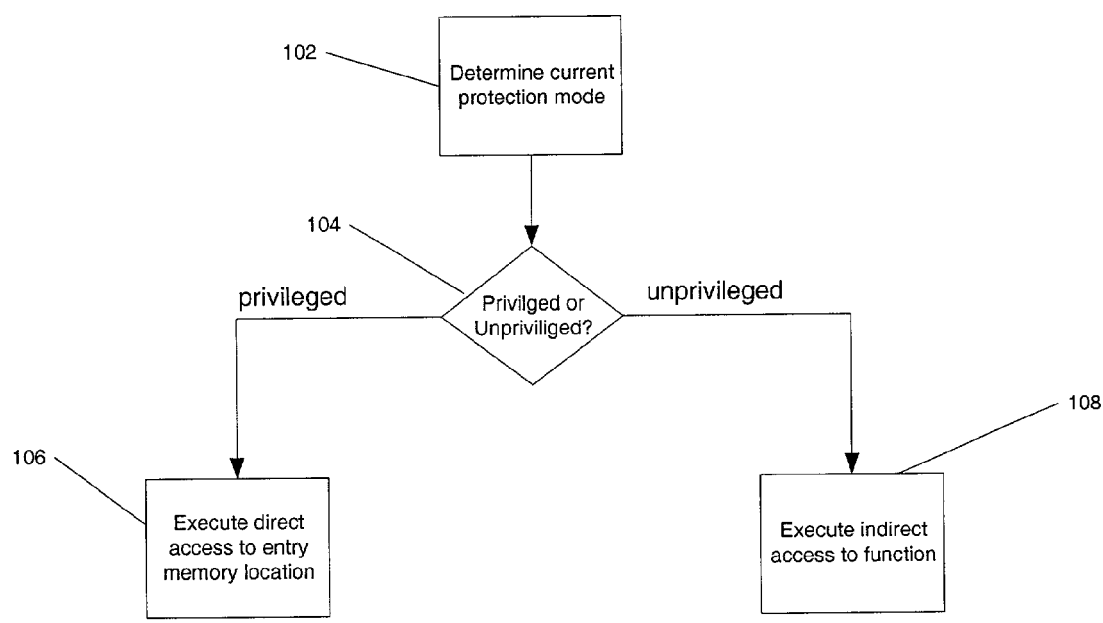
FIG. 1 shows a flowchart of the operation of a first embodiment according to the present invention.

The operation of a first exemplary embodiment according to the present invention is illustrated by the flow chart of FIG. 1. First, the current protection mode is determined (step 102). If the current protection mode is privileged (step 104), a direct change in program control (e.g., a "jump" instruction) is made to the entry memory location of the desired function (step 106). If the current protection mode is not privileged, an indirect system call facility is used (step 108), such as an interrupt-based system call. As a result, if the operating system being used does not support exception-based system calls, the flexibility of exception-based system calls may be emulated through the use of an appropriately styled code stub.

An example of source code and machine code to implement the first example code stub is shown in the table below:

TABLE 1

| Source Code | Machine Code |
| --- | --- |
| lte: | |
| movl % cs, % eax | 0x8C, 0xC8 |
| andl $0x3, % eax | 0x83, 0xE0, 0x03 |
| movl $lte, % eax | 0xB8, 0x00, 0x00, 0x00, 0x00 |
| movl 20(% eax), % edx | 0x8B, 0x50, 0x14 |
| jnz lteUser | 0x75, 0x02 |
| jmp *% edx | 0xFF, 0xE2 |
| lteUser: | |
| int 0x40 | 0xCD, 0x40 |
| nop | 0x90 |

In this example, the last 2 bits of the code segment register ("%cs," provided by the Pentium® III processor) indicate the current protection mode of the executing task (for example, 0 for privileged mode, 3 for unprivileged mode). Other registers or memory locations could of course be used for the same purpose on other processors. According to the above code stub, if the current mode is not unprivileged (i.e., the last two bits of the code segment register are non-zero), a direct jump is made to the entry address of the desired function (provided in register "% edx"). If the current mode is unprivileged (i.e., the last two bits of the code segment register are zero), the system call is made using the interrupt based system call (in this example, "int 0x40").

Note that this first example allows for easy implementation of direct access to protected memory in systems that employ interrupt-based system calls, thus offering the possibility of significant performance increases when operating both the operating system and application in privileged mode (which would otherwise not be available), and providing the flexibility to change protection modes dynamically (e.g., for debugging purposes). Further note that the exemplary code stub is implemented in a small package of twenty total bytes, and the quantity of bytes will not vary from function call to function call (which will allow for interchangeability, as discussed in further embodiments below).

Figure 2:
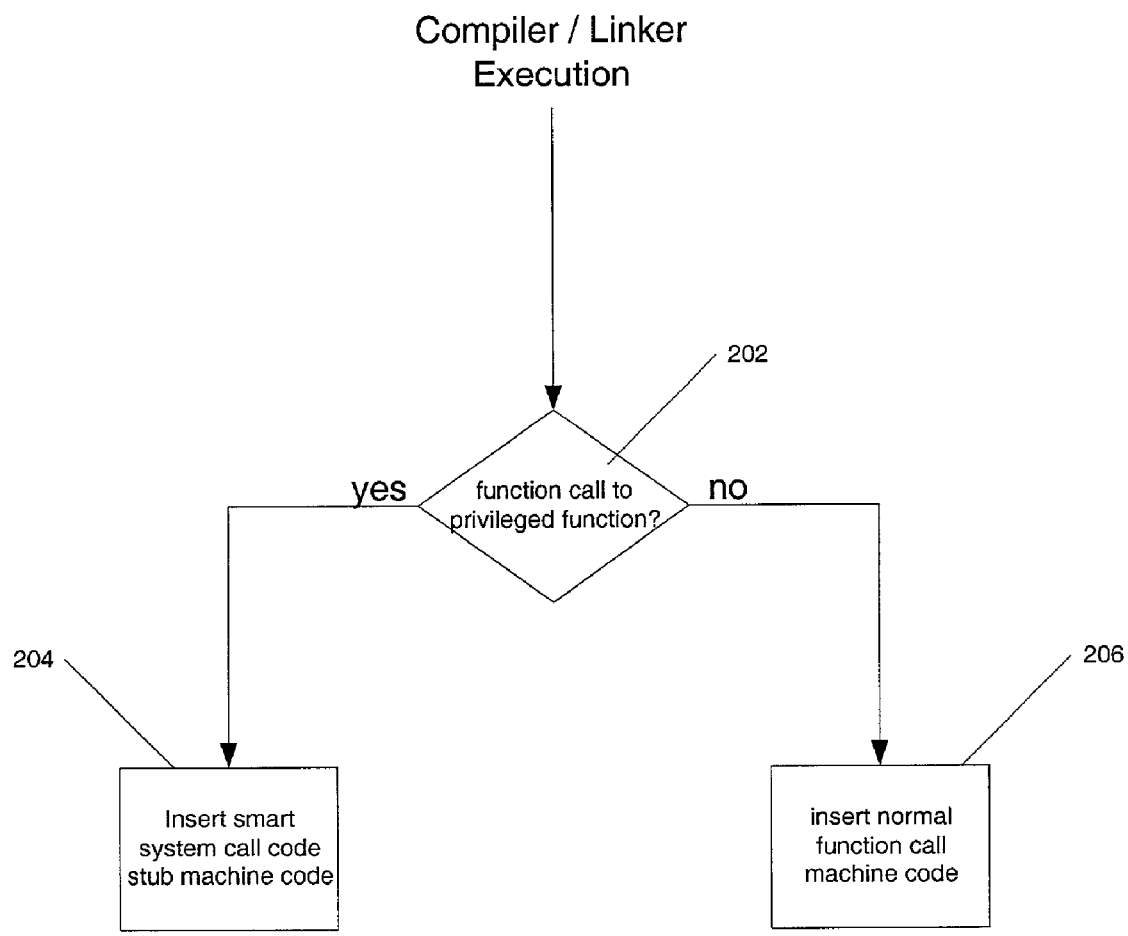
FIG. 2 shows a flowchart of an exemplary compilation method according to the present invention.

The code stub of the exemplary embodiment shown above may be inserted, for example, during compilation and/or linking of application source code. As an example, as shown in FIG. 2, a compilation method may be executed where the compiler determines whether a source code function call is a function call to a function to be executed in a privileged mode—e.g., a kernel function (step 202). This could be determined through a symbol resolution process, or identification of special instructions for privileged accesses (e.g., the interrupt-based system call). When such a system call is identified, the smart system call code stub may be inserted into the machine code for the desired function call (step 204), thus providing the smart system call capability without additional user involvement. Function calls to non-privileged functions would be processed using the normally implemented machine code (step 206).

Another advantage realized from the use of the smart system call is the ability to adjust the type of system call method used, depending on the type of processor. For example, referring again to the example of the Pentium® III microprocessor, the "sysenter" op code is provided as part of the Pentium® III instruction set to allow for hardware-assisted protection mode switching. This op code is not available on other of the so-called "x86" architecture processors. Empirical testing has revealed that at least under certain conditions, the protection mode switch provided by the "sysenter" op code is faster than the protection mode switch provided by exception-based system calls:

TABLE 2

| | Average cycle time |
| --- | --- |
| No protection switch needed: | |
| "sysenter" instruction | 6.833 microseconds. |
| exception-based system call | 6.833 microseconds |
| Protection switch needed: | |
| "sysenter" instruction | 9.833 microseconds. |
| exception-based system call | 25.333 microseconds |

By specifying the processor type at compile time, an application can use a code stub that achieves the fastest performance available.

A second exemplary embodiment according to the present invention will now be described. A code stub used in this second embodiment is shown below:

TABLE 3

| Source Code | Machine Code |
| --- | --- |
| lte: | |
| movl % cs, % eax | 0x8C, 0xC8 |
| andl $0x3, % eax | 0x83, 0xE0, 0x03 |
| movl $lte, % eax | 0xB8, 0x00, 0x00, 0x00, 0x00 |
| jnz lteUser | 0x75, 0x03 |
| jmp *20(% eax) | 0xFF, 0x60, 0x14 |
| lteUser: | |
| movl % esp, % ecx | 0x89, 0xE1 |
| sysenter | 0x0F, 0x34 |
| nop | 0x90 |

As in the first exemplary embodiment, the last 2 bits of the code segment register indicate the current protection mode of the executing task (for example, 0 for privileged mode, 3 for unprivileged mode). According to the above code stub, if the current mode is not unprivileged (i.e., the last two bits of the code segment register are non-zero), a direct jump is made to the entry address of the desired function (provided in register "%eax"). If the current mode is unprivileged (i.e., the last two bits of the code segment register are zero), a system call is made using the "sysenter" op code.

Figure 3:
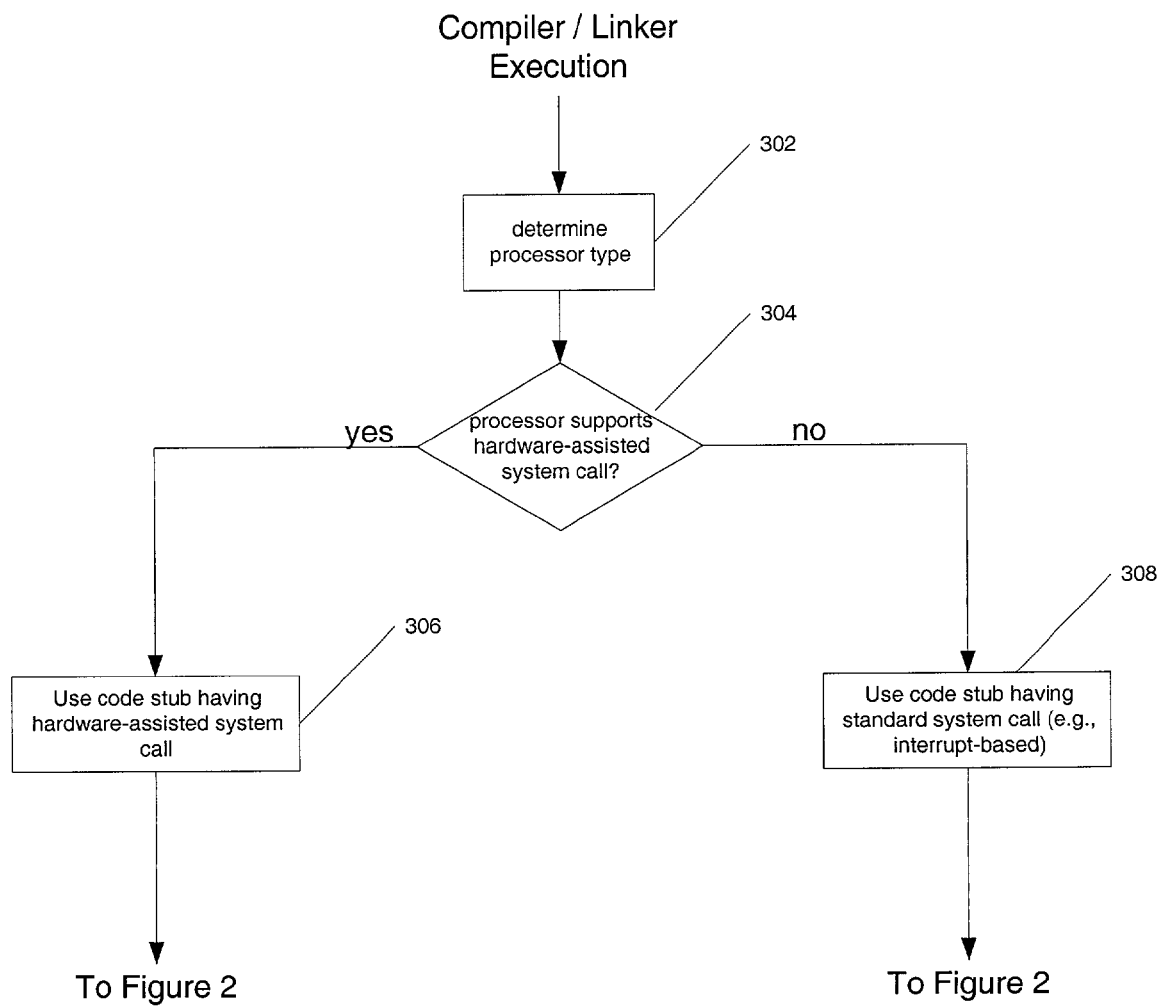
FIG. 3 shows a flowchart of a compilation method of a second embodiment according to the present invention.

FIG. 3 illustrates an exemplary compilation method according to the second embodiment. Initially, the compiler/linker determines the processor type that will be executing the code to be compiled/linked (step 302). This may be identified in various ways: compiler instruction in the source code file, user input at the compiler interface or command line, etc. If the processor type is such that it supports an instruction for hardware-assisted protection mode switching (step 304), the compiler is set to use a code stub that includes an option to use such a protection mode switching instruction—in this example, the code stub of the second embodiment described above (step 306). Otherwise, the compiler is set to use an alternate code stub—such as the code stub from the first embodiment that implements an interrupt-based system call (step 308). The compiler/linker may then process the source code according to the method described by FIG. 2 for inserting code stubs into machine code.

Another advantage realized from the use of the smart system call is the ability to dynamically adjust the type of system call method used. As discussed above, certain processors, such as the Pentium® III, provide special instructions that provide hardware assisted protection mode switching. By testing the processor ID register provided in the Pentium® III processor during run time (e.g., by using the "cpuid" instruction provided by the processor), the processor type may be determined, thus determining whether the "sysenter" op code is available for use.

Figure 4:
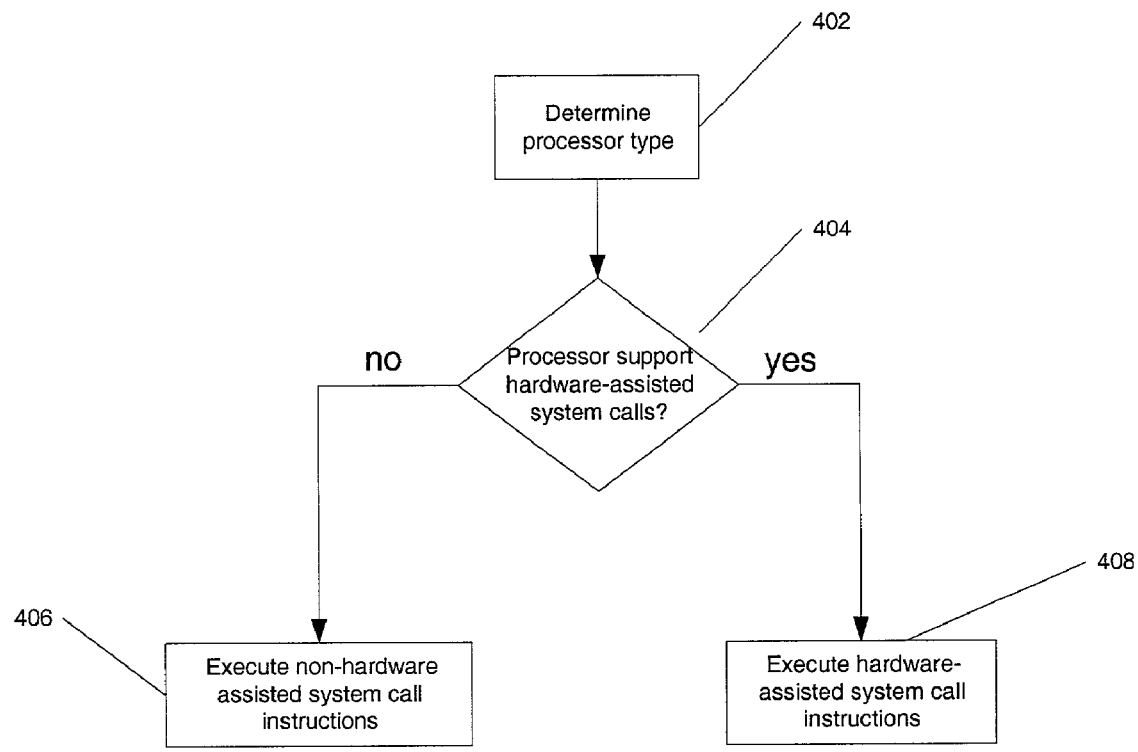
FIG. 4 shows a flowchart of a third embodiment according to the present invention.

FIG. 4 illustrates a method of a third embodiment according to the present invention, which implements dynamic selection of system call methodologies. This method may be implemented as a code stub in a manner similar to the first two embodiments described above. The processor type is first determined (step 402). This determination may be done in two steps: at the initiation of execution using resources made available by the processor manufacturer for determining the processor type (e.g., the cpuid instruction of the Pentium® III processor), with the result formatted in a manner that is easy to decode, for example, as one or more bits in a dedicated register location; and again at the time of the attempted system function call. Alternatively, these two steps may be combined to be performed at the time of the attempted system call, if the resources and space in the code stub permit. If the processor supports hardware-assisted protection mode switching (step 404), the instructions in the code stub used to perform the hardware-assisted system call are executed (step 406). Otherwise, the instructions in the code stub to perform alternate system calls (e.g., exception-based system calls) are executed 408.

While the above example describes dynamically switching system call methods based on processor type, dynamic switching could also be implemented on a per task or per system call basis, simply by manipulating the contents of the register/memory location used to store the processor type indicator. Such an implementation might be useful for debugging purposes—e.g., requiring an exception-based system call during debugging (which produces additional debugging information), but switching to the hardware-assisted system call during normal execution.

In a fourth embodiment according to the present invention, a facility is provided to allow substitution of code stubs based on processor type or operating system configuration. As illustrated in the embodiments above, code stubs for various system call methods may be provided, each providing an amount of flexibility in permitting the most appropriate system call method to be executed. Additionally, where the machine code generated by the code stubs provided is maintained at identical sizes across each code stub type, binary compatibility may be achieved, and thus the need to recompile/relink software when code stubs are changed may be avoided.

For example, as shown above the code stub for the interrupt-based system call may be implemented in twenty bytes of machine code (see Table 1). Likewise the code stub for the hardware-assisted system call may be implemented in twenty bytes of machine code (see Table 3). An exemplary code stub for a purely exception-based system call is shown in Table 4, below, which also be implemented in twenty bytes of machine code:

TABLE 4

| Source Code | Machine Code |
| --- | --- |
| lte: | |
| movl $lte, % eax | 0xB8, 0x00, 0x00, 0x00, 0x00 |
| movl 20(% eax), % edx | 0x8B, 0x50, 0x14 |
| jmp *% edx | 0xFF, 0xE2 |
| nop | 0x90 |
| nop | 0x90 |
| nop | 0x90 |
| nop | 0x90 |
| nop | 0x90 |
| nop | 0x90 |
| nop | 0x90 |
| nop | 0x90 |
| nop | 0x90 |

Binary compatibility allows for each of these code stubs to be interchanged in any object code generated include the code stubs (with appropriate address insertions to match the desired function memory address). Moreover, should other types of system call facilities become available, or should the system call method supported by the operating system change in subsequent versions, additional code stubs may be generated and substituted, without the need to perform recompilation.

As can be seen from the exemplary embodiment, applications that reside in unprivileged address space can run in both unprivileged mode and privileged mode "on the fly" by adjusting the contents of the protection switching variable. Applications can be statically compiled and linked without the need to later re-compile and link the application due to a change in protection mode. Thus, the application may be run in unprivileged mode for debugging purposes, and then switched to privileged mode to achieve faster execution once reliability has been proven. Furthermore, the smart system call may be used to switch the system call method used, thus allowing the most effective system call to be used that is available in the computing system architecture.

As an additional implementation, the smart system call can be used in conjunction with an "inter-processor interrupt" (ISI) based system call for the multi processor system. By using this approach, exclusive access to shared kernel data in the multi processor system can be insured.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method, comprising:
   identifying a program code segment implementing an access to a memory area to be executed within a privileged processing mode;
   replacing the program code segment with a substitute code segment;
   wherein the substitute code segment includes program code to
      identify a current processing mode of the program code segment,
      execute a direct program flow control instruction if the current processing mode is the privileged processing mode, and
      execute an indirect program flow control instruction if the current processing mode is an unprivileged processing mode.

* * * * *